United States Patent [19]

Pringle et al.

[11] Patent Number: 4,586,046

[45] Date of Patent: Apr. 29, 1986

[54] AUTOMATIC REPROGRAMMING MEANS FOR COUNTERMEASURES SYSTEM

[75] Inventors: Robert D. Pringle; William A. O'Berry, both of Severna Park, Md.

[73] Assignee: The United States of America as represented by the Secretary of the Air Force, Washington, D.C.

[21] Appl. No.: 369,029

[22] Filed: Jun. 13, 1973

Related U.S. Application Data

[63] Continuation-in-part of Ser. No. 64,927, Aug. 5, 1970, abandoned.

[51] Int. Cl.⁴ ............................................. G01S 7/38
[52] U.S. Cl. ................................................ 343/18 E
[58] Field of Search ..................................... 343/18 E

[56] References Cited

U.S. PATENT DOCUMENTS

| 3,891,989 | 6/1975 | Barney et al. | 343/18 E |
| 4,097,865 | 6/1978 | Jones | 343/18 E |
| 4,159,478 | 6/1979 | Jaklitsch et al. | 343/18 E |

Primary Examiner—T. H. Tubbesing
Attorney, Agent, or Firm—Donald J. Singer; Willard R. Matthews

[57] ABSTRACT

A countermeasures system technique for destroying threat radar frame of reference. Automatic change of false target pattern is accomplished by any one of three different switching schemes or by any combination of them. The switching schemes comprehend (a) changing polarity of digital counts delivered to system range position program matrix inputs; (b) alternately enabling and disabling selected outputs of the range position program matrix, and (c) interchanging selected input gates of the system angle position program matrix.

7 Claims, 11 Drawing Figures

AUTOMATIC REPROGRAMMING MEANS FOR COUNTERMEASURES SYSTEM

CROSS REFERENCE TO RELATED INVENTION

This is a continuation-in-part of application Ser. No. 64,927 filed Aug. 5, 1970 now abandoned.

BACKGROUND OF THE INVENTION

This invention relates to electronic countermeasure systems, and in particular to techniques and apparatus for automatically changing the system's false target pattern.

The primary purpose of an electronic countermeasures system is to transmit a program of false targets in order to confuse and saturate enemy search and track radar systems. False target jamming programs are used by ECM systems to present an enemy radar operator with numerous targets on his radar display. The targets are produced by the ECM system to resemble the characteristics of an actual radar return from an aircraft, but are positioned at different ranges and angles from the actual radar return of the aircraft carrying the ECM equipment. The false targets are intended to confuse the operator and deny him information as to the position of the aircraft penetrating his air space. Ideally the enemy radar operator would be unable to distinguish between false targets and the countermeasures system carrying aircraft that is transmitting them. If, however, the operator detects a peculiarity in the pattern of targets that distinguishes the true target in its relationship to the false ones tracking of the true target can be accomplished without regard to the effect of the countermeasures system. It is therefore desirable to change the false target pattern upon the initiation of each run. Such a technique has the effect of periodically destroying the enemy radar's frame of reference thus requiring a new search for all targets in order to again detect any previously noted peculiarity. In the past, changes in false target patterns have been accomplished mechanically by changing the programming events. There is currently a need, therefore, for electronic false target pattern changing equipment that responds automatically to discrete enemy search radar events.

SUMMARY OF THE INVENTION

Electronic countermeasures systems of the type to which the present invention applies generally comprise radar transmitting and receiving apparatus, false target program means, a false target repeater, oscillator clocks and other conventional radar circuitry. The false target program means usually comprises both range and angle matrices. Range information is derived from an oscillator clock that is locked in phase with the received PRF of the threat radar. This information is in the form of digital count which the programmer (range matrix) decodes to generate pulses positioned in time with respect to the received pulse. Angle information is derived from another clock that is locked in phase and in frequency to the scan rate of the threat radar. This information is communicated to the angle matrix in the form of gates. The radar receiver is also provided with receiver lock up indicating means.

The present invention provides automatic changes in the false target program in three different ways. Variation in the range of certain false targets is accomplished by switching circuits associated with selected range program matrix inputs. Further changes in the range false target program are also accomplished by selectively enabling and disabling some range program matrix outputs. Angle (azimuth) changes are accomplished by switching circuits associated with certain angle program matrix inputs. All switching circuits are actuated by command signals received from the system lock up indicating means. All combinations of these automatic program change devices are also comprehended by the invention.

It is a principal object of the invention to provide a new and improved electronic countermeasures system that automatically destroys enemy search radar frame of reference after every run.

It is another object of the invention to provide an electronic countermeasures system having means for automatically changing the range position of selected false targets at periodic intervals.

It is another object of the invention to provide an electronic countermeasures system having means for automatically adding and removing false targets to and from its false target program at periodic intervals.

It is another object of the invention to provide an electronic countermeasures system having means for automatically changing the angle position of selected false targets at periodic intervals.

These, together with other objects, features and advantages of the invention will become more apparent from the following detailed description when taken in conjunction with the illustrative embodiment in the accompanying drawings.

DETAILED DESCRIPTION OF THE PREFERRED EMBODIMENT

Figure 1:
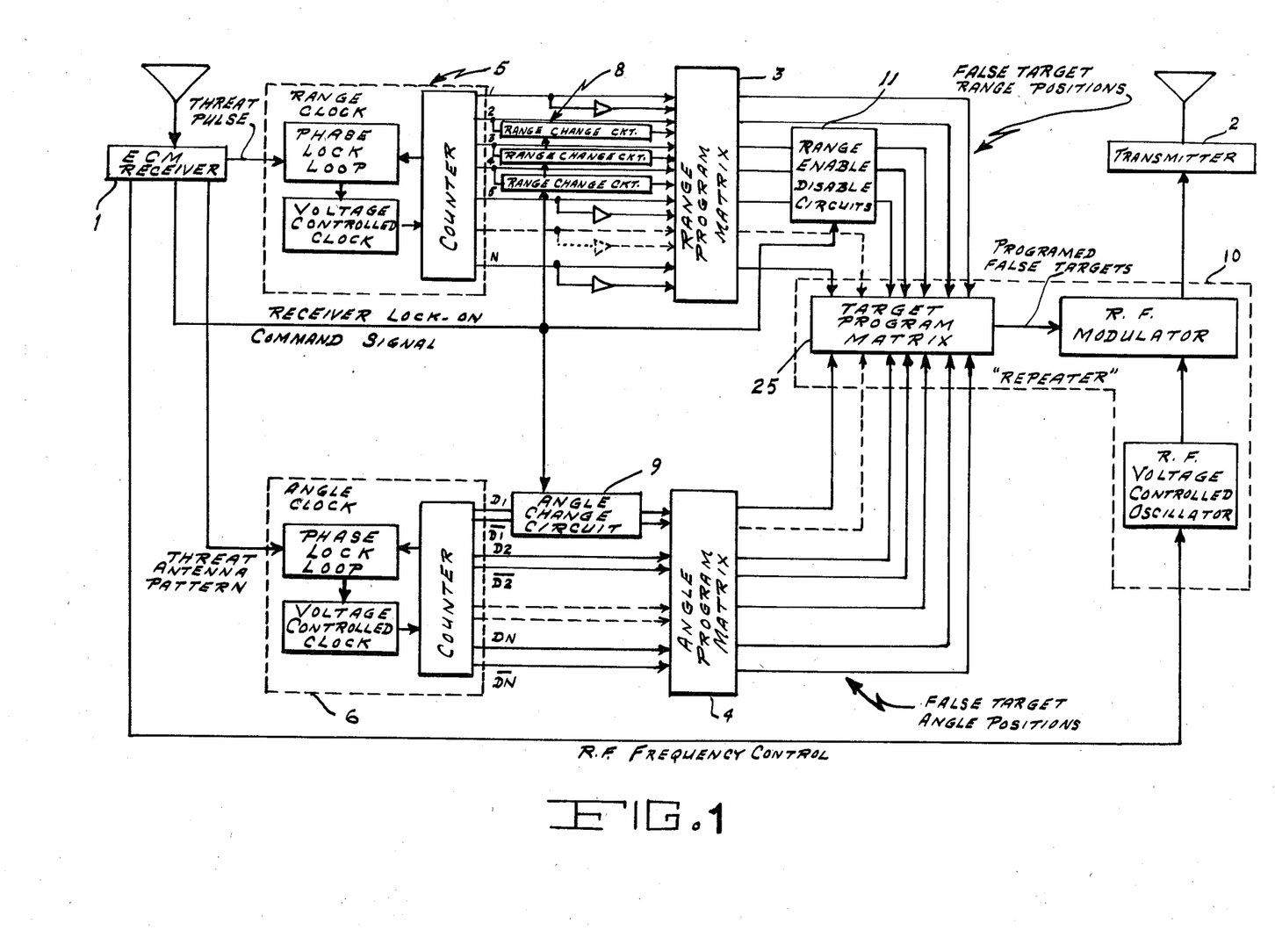
FIG. 1 is a block diagram of an electronic countermeasures system incorporating the principles of the present invention.

Referring now to FIG. 1, there is illustrated thereby a block diagram of a countermeasures system incorporating the several features of the present invention. The transmit and receive antennas, receiver 1, transmitter 2, range program matrix 3, angle matrix 4, clocks 5 and 6, and repeater 10 are conventional countermeasures system components. Countermeasures systems of course include other components not shown in FIG. 1. These have been omitted from the present description since they are not germane to the invention. Range change circuit 8 together with receiver lock on command signals from receiver 1 provide automatic false target range changes in accordance with one feature of the invention. Likewise, enable-disable circuits 11 and angle change circuit 9 provide automatic false range target inclusion and exclusion and automatic false target angle changes, respectively.

The present invention comprehends three means for automatically changing the countermeasures system false target position program. These include (a) changing the information which is used to produce the range positions of the false targets; (b) disabling some range positions and enabling others; and (c) changing the information which is used to produce the angular positions of the false targets. All combinations of these means are also within the scope of the invention.

Figure 2:
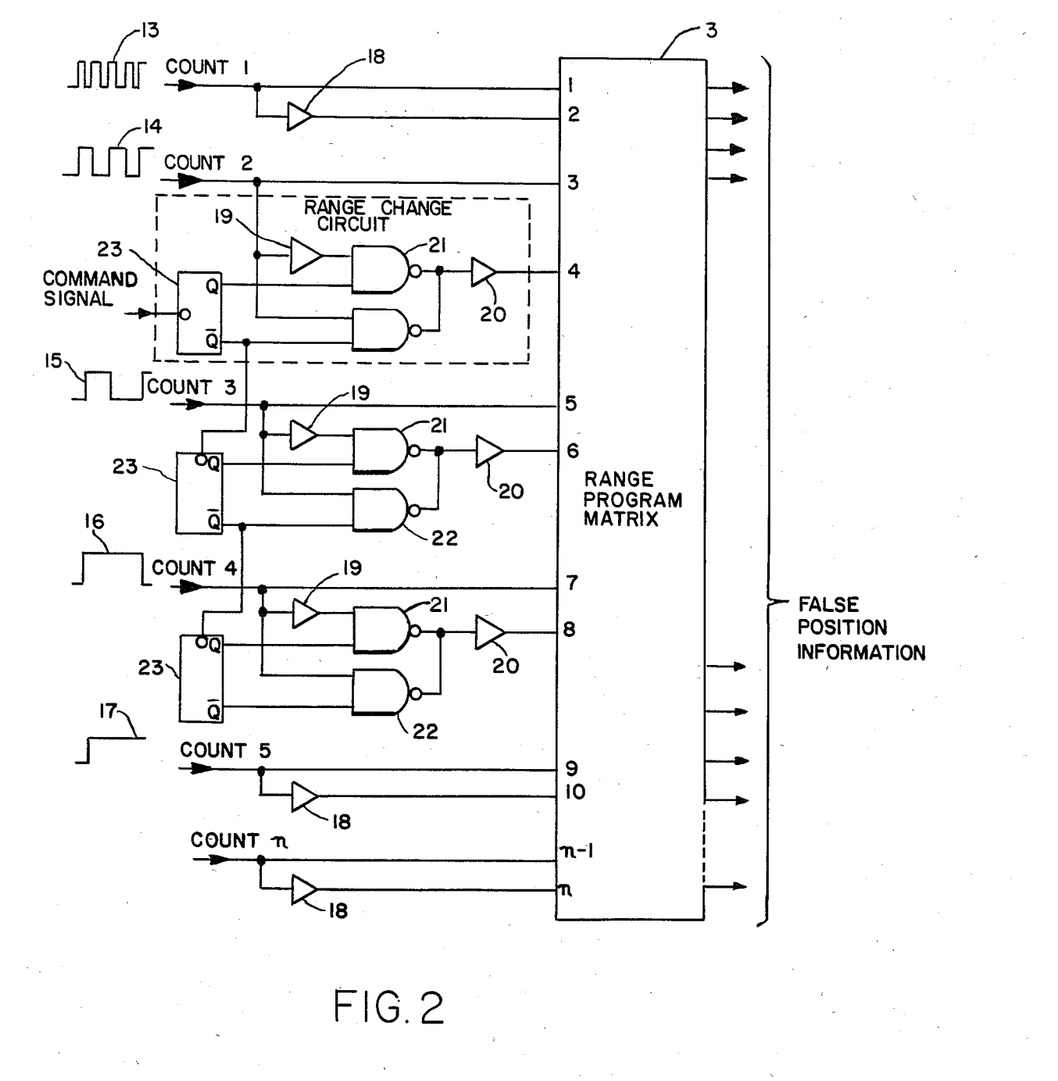
FIG. 2 is a schematic diagram illustrating switching circuits for accomplishing automatic false target range changes.
Figure 6:
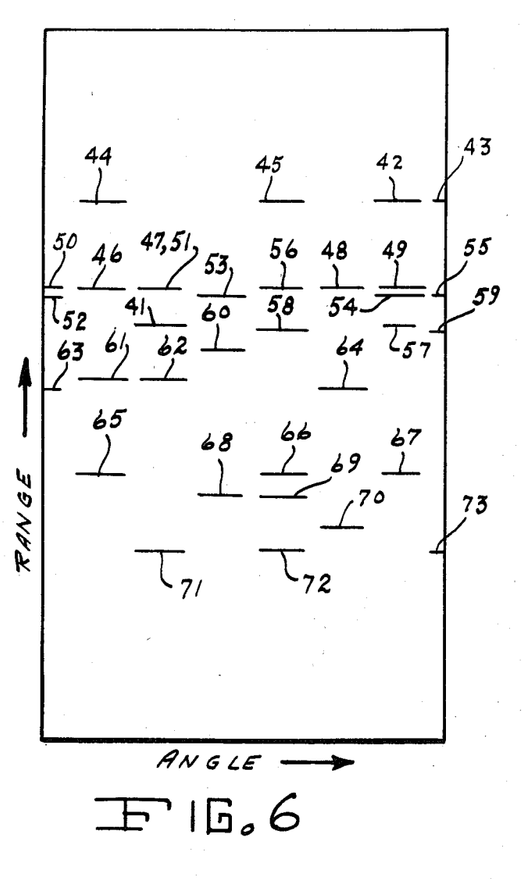
FIG. 6 illustrates a radar display of a true-target together with a particular program of false targets.
Figure 7:
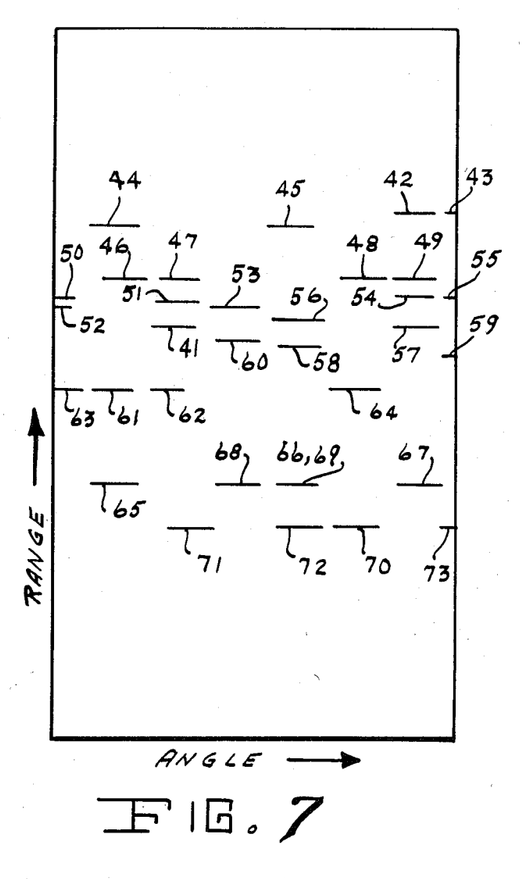
FIG. 7 illustrates a radar display of the targets of FIG. 6 as modified by the switching circuits of FIG. 2.

The schematic diagram of FIG. 2 illustrates switching circuits that will accomplish (a). Matrix 3 stores a particular false target range program. In a conventional countermeasures system input counts such as digital counts 13 through 17 are delivered to the matrix inputs. They are delivered directly (as to input 1) and inverted (as through amplifier 18) to input 2. The range information in these digital counts is derived from oscillator clock 5 which is locked in phase with the PRF from the threat radar. Range program matrix 3 decodes the digital counts and generates pulses positioned in time (range) with respect to the received pulse. These output pulses are delivered to repeater 10 which provides signals for transmission to the threat radar. One basic concept of the invention comprehends adding the circuitry comprising bistable flip-flop 23, digital gates 21 and 22 and amplifiers 19 and 20 to selected range program matrix inputs. The input to the program matrix at pin 4 would be the inverted count 2, the input to pin 6 would be the noninverted count 3 and the input to pin 8 would be the inverted count 4 without automatic reprogramming. By adding the additional circuitry described above, these inputs may be changed alternately in polarity thus changing the positions of the false targets which uses these inputs for position information. The false targets which do not use these inputs would retain their original positions with respect to the true target. FIGS. 6 and 7 illustrate the effect of such an automatic false target changing system on the threat radar display. FIG. 6 shows the display of a true target 41 and a program of false targets 42 through 73. Range shifting of false targets 42 through 53, 56, 58 through 62, 65 through 69, and 71 through 73 produces the display of FIG. 7.

Figure 3:
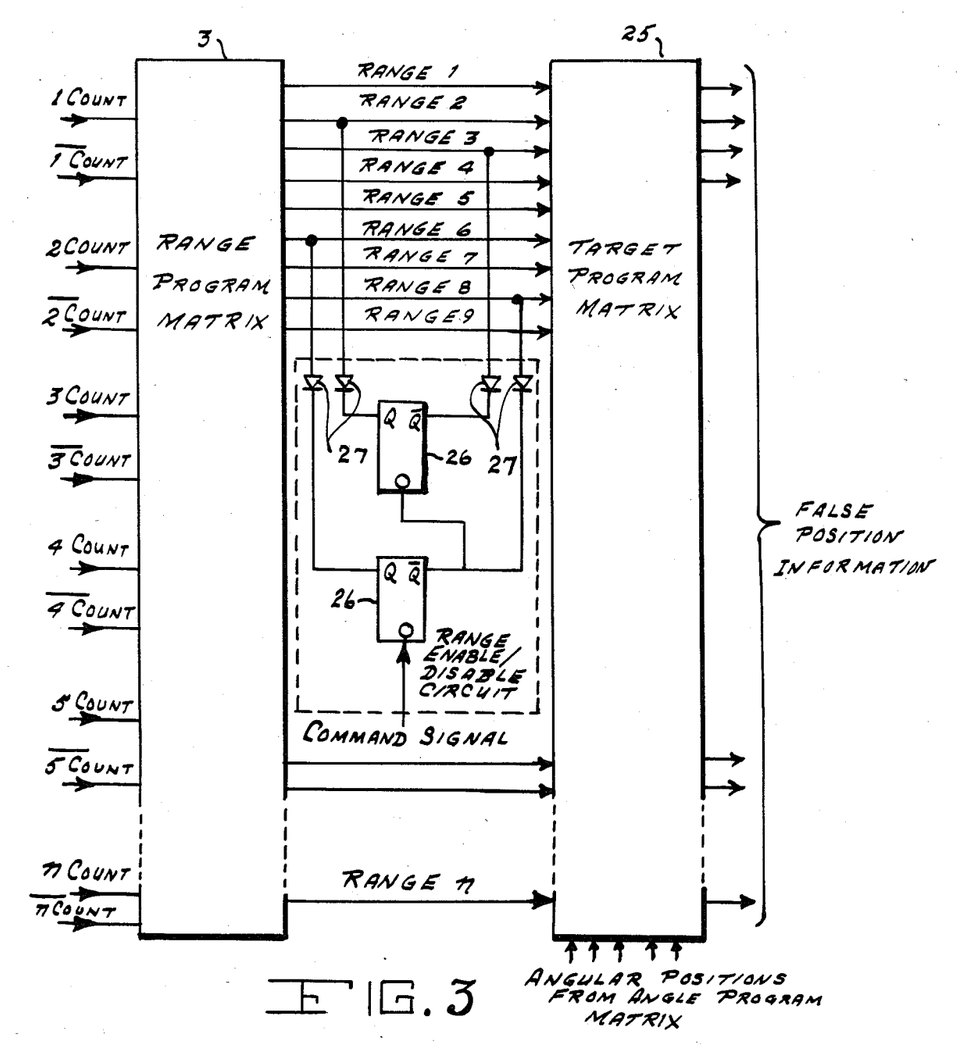
FIG. 3 is a schematic diagram illustrating switching circuits for enabling and disabling range program matrix outputs.
Figure 8:
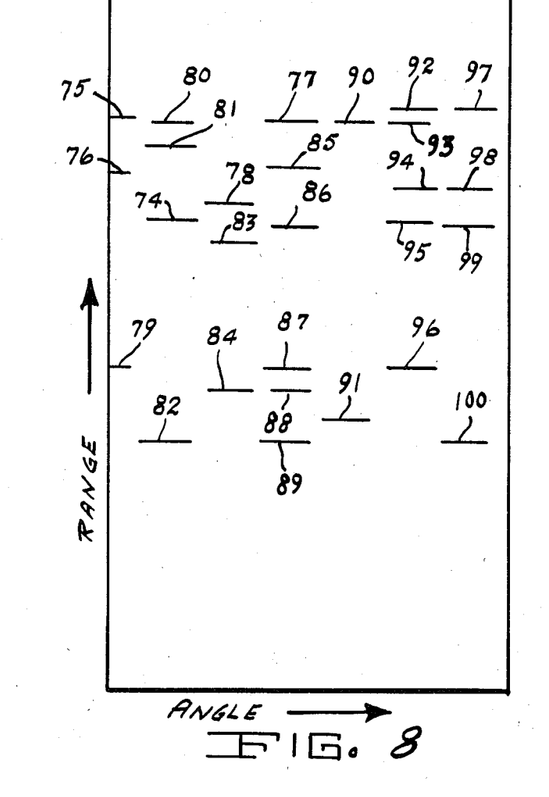
FIG. 8 illustrates a radar display of another true target together with a particular program of false targets.
Figure 9:
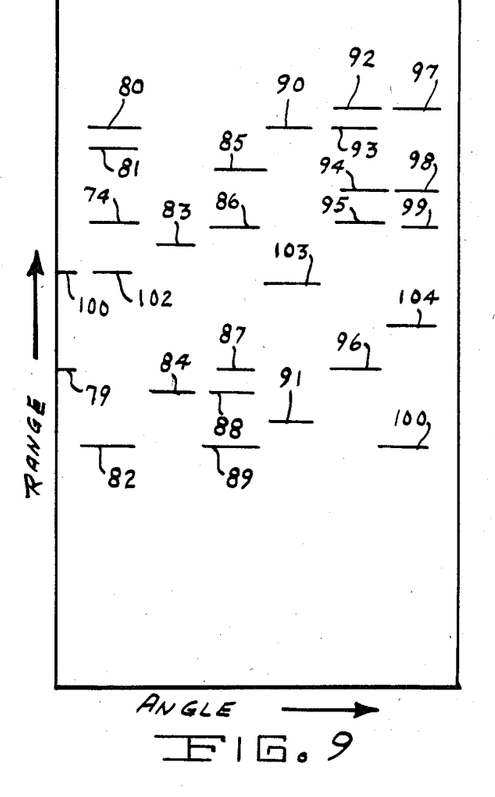
FIG. 9 illustrates a radar display of the target of FIG. 8 as modified by the switching circuits of FIG. 3.

FIG. 3 is a schematic diagram of the circuitry required to enable some ranges and disable others. Flip-flops 26 are arranged in combination with diodes 27 as shown and connected between range program matrix 3 and target program matrix 25 to alternately enable and disable certain range program matrix outputs. Without automatic reprogramming all false positions would be present at the output of the target program matrix. By adding the additional circuitry of FIG. 3 positions 2, 3, 6 and 8 may be alternately enabled and disabled. To the enemy search radar operator this would have the effect of moving the position of some false targets and thus destroying any frame of reference acquired during a previous run. FIGS. 8 and 9 illustrate this effect. FIG. 8 shows a radar display showing true target 74 together with the array of false targets 75 through 100. FIG. 9 shows the same display wherein false targets 75, 76, 77 and 78 have been disabled and additional false targets 101, 102, 103 and 104 have been enabled by circuits of the type disclosed by FIG. 3.

Range program matrix 3 and angle program matrix 4 are a series of diode AND gates which decode the binary count from the range and angle clock counters. The matrix of diodes 12 and resistors 24 illustrated by FIG. 5 is a typical mechanization of this function. Each diode AND gate in the range program matrix will provide one false target range position, and each AND gate in the angle program matrix will provide one false target angle position. The output of the range and angle program matrices are then ANDED together in the target program matrix element 25 to produce discrete false targets. Elements 8, 9 and 11 of FIG. 1 are the circuit elements of this specific mechanization of the disclosed concept. Element 8 is the range change circuit, element 9 is the angle change circuit, and element 11 is the range enable/disable circuit. The mechanization details are disclosed in FIGS. 2, 3 and 4.

Figure 4:
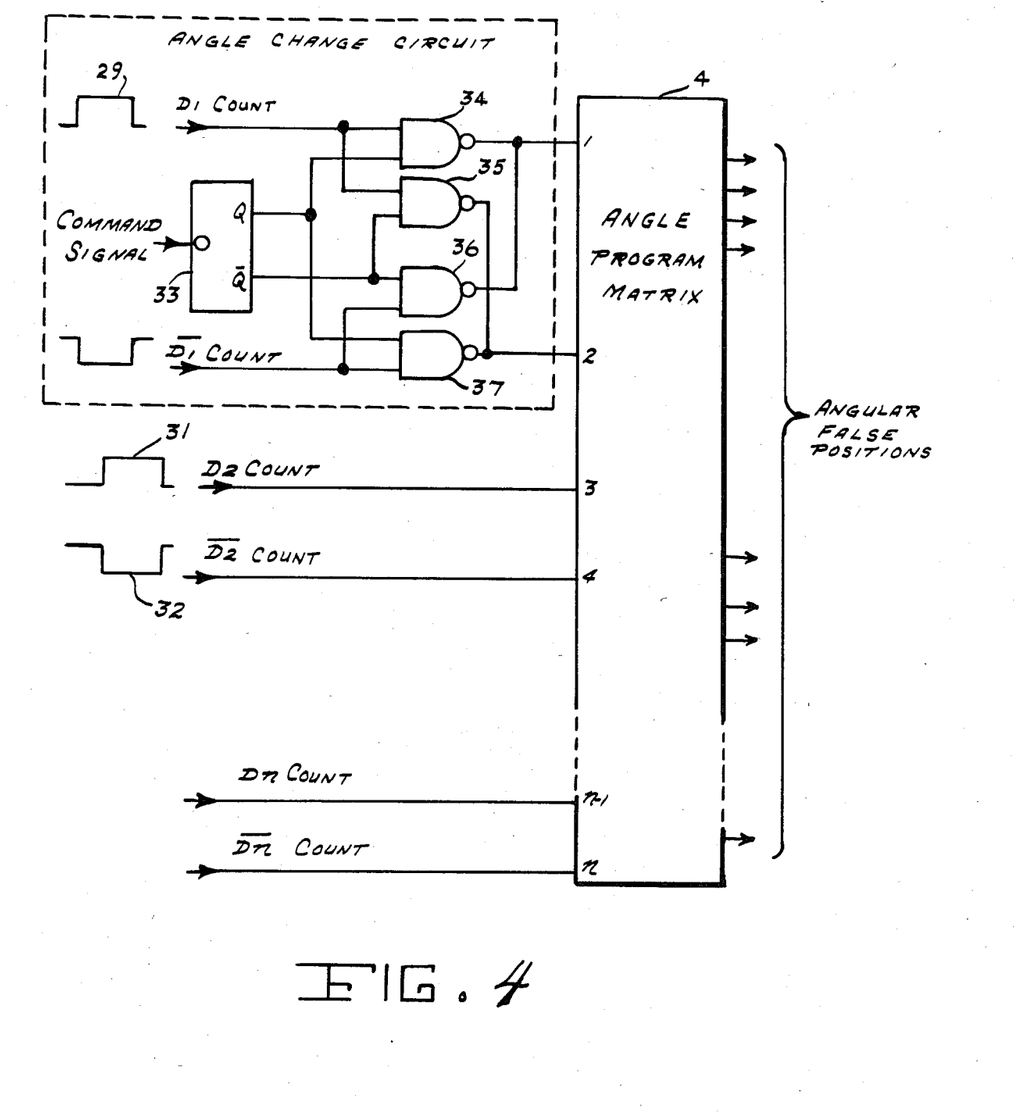
FIG. 4 is a schematic diagram illustrating switching circuits for accomplishing automatic false target angle changes.
Figure 5:
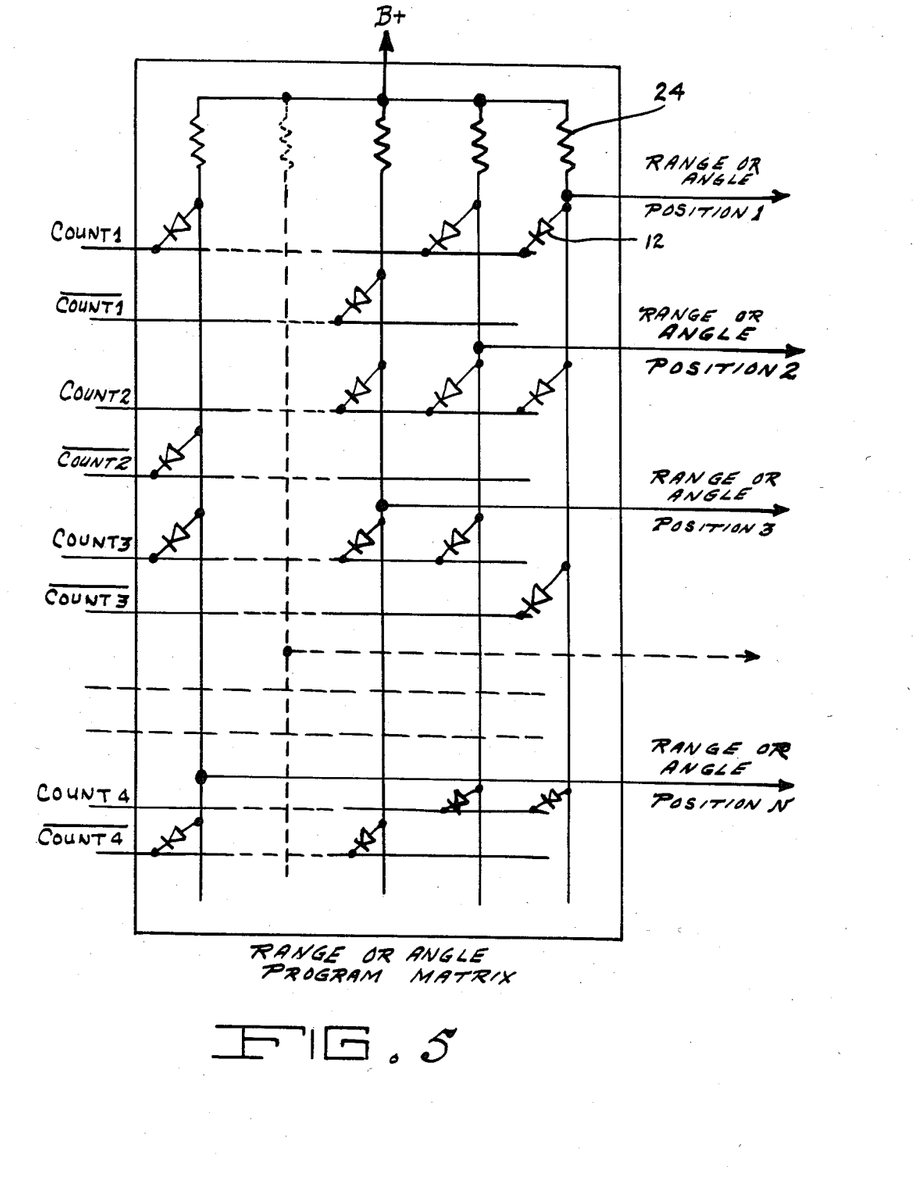
FIG. 5 illustrates the manner in which the system angle and range program matrices are mechanized.
Figure 10:
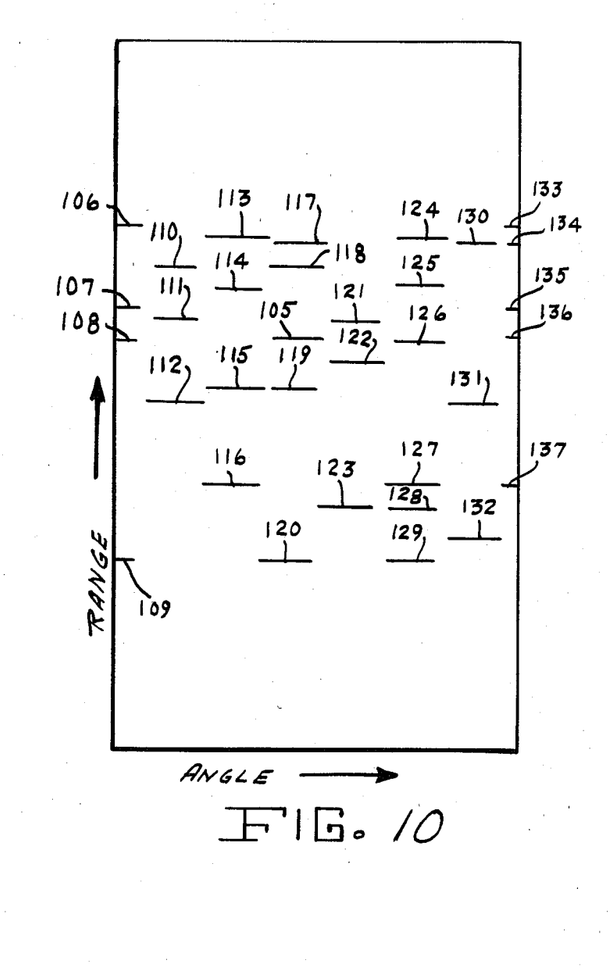
FIG. 10 illustrates a radar display of yet another true target together with a particular program of false targets.
Figure 11:
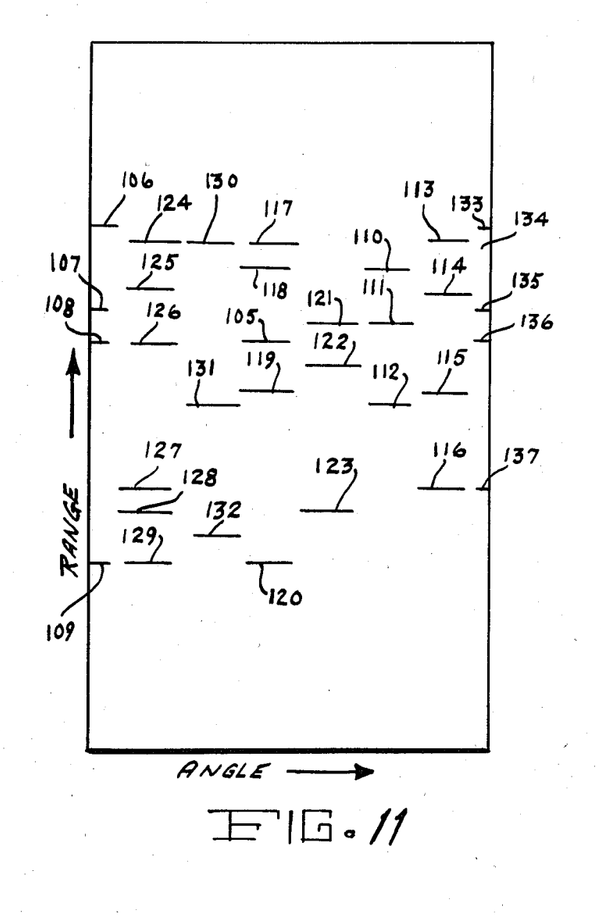
FIG. 11 illustrates a radar display of the targets of FIG. 10 as modified by the switching circuits of FIG. 4.

FIG. 4 is a schematic diagram of the angle programming portion of the false target circuitry. Switching circuits comprising the arrangement of bistable flip-flop 33 and digital gates 34, 35, 36, 37 are added to selected inputs of angle program matrix 4. The gates D1 and $\overline{D1}$, D2, $\overline{D2}$ etc. are generated by clock 6 which is locked to the scan rate frequency. Upon receipt of a receiver lock up command signal from ECM receiver 1 the targets which were gated by D1 gate will change to the position of the $\overline{D1}$ gate and vice versa while those gated by D2 and $\overline{D2}$ will remain stationary. The signal which causes the false target program to change originates in the ECM receiver. As the aircraft approaches the enemy radar the radar transmissions are received by the ECM receive. When a signal is detected by the receiver, and it matches the characteristics of an enemy radar, the receiver will lock up to this enemy radar. This lock up indication is used as a command signal to change the false target program so that each time the ECM system locks to a radar (and likewise each time the enemy acquires the ECM system). The command will cause a different false target array to be presented. The counter signals D1 - - - DN are derived from the angle clock which is phase locked to the threat radars antenna pattern. Angle clock 6 of FIG. 1 shows in more detail the angle clock mechanization, and the derivation of the angle clock counts. The effect of this automatic programming technique is demonstrated by FIGS. 10 and 11. FIG. 10 shows true target 105 together with the array of false targets comprising false targets 106 through 137. FIG. 11 shows the same array of target wherein false targets 110 through 116 and 124 through 132 have been shifted in angle.

FIGS. 7, 9 and 11 show the effect of each technique individually. By combining the three techniques, a large number of different programs becomes possible and the possibility of an enemy search radar operator maintaining any frame of reference by which he could identify the true target more quickly becomes even more remote.

Although the invention disclosed herein has been described with reference to specific embodiments, it is not intended that it be so limited. Since many variations and alternative embodiments within the scope and spirit of the invention will occur to those skilled in the art it is understood that any limitation thereof will be defined by the claims appended hereto.

What is claimed is:

1. In an electronic countermeasures system having; a false target range position program matrix with multiple inputs and outputs; means, responsive to an oscillator clock in phase lock with received threat radar PRF, for delivering discrete digital counts to each said range position matrix input; a false target angle position program matrix with multiple inputs and outputs; means, responsive to an oscillator clock locked in phase and frequency to the scan rate of received threat radar signals, for gating each said angle position program matrix input; and, means for detecting and indicating system receiver lock up information:

automatic reprogramming means comprising;

switching means for alternately changing the polarity of the digital counts delivered to selected inputs of said range position program matrix, said switching means being actuated by command signals responsive to system receiver lock up information.

2. Automatic reprogramming means as defined in claim 1 including switching means for alternately enabling and disabling selected outputs of said range program matrix.

3. Automatic reprogramming means as defined in claim 2 including switching means for interchanging selected gating means of said angle position program matrix.

4. Automatic reprogramming means as defined in claim 1 including switching means for interchanging selected gating means of said angle position program matrix.

5. In an electronic countermeasures system having; a false targer range position program matrix with multiple inputs and outputs; means, responsive to an oscillator clock in phase lock with received threat radar PRF, for delivering discrete digital counts to each said range position matrix input; a false target angle position program matrix with multiple inputs and outputs; means, responsive to an oscillator clock locked in phase and frequency to the scan rate of received threat radar signals, for gating each said angle position program matrix input; and, means for detecting and indicating system receiver lock up information:

automatic reprogramming means comprising;

switching means for alternately enabling and disabling selected outputs of said range position program matrix, said switching means being actuated by command signals responsive to system receiver lock up information.

6. Automatic reprogramming means as defined in claim 2 including switching means for interchanging selected gating means of said angle position program matrix.

7. In an electronics countermeasures system having; a false target range position program matrix with multiple inputs and outputs; means, responsive to an oscillator clock in phase lock with received threat radar PRF, for delivering discrete digital counts to each said range position matrix input; a false target angle position program matrix with multiple inputs and outputs; means, responsive to an oscillator clock locked in phase and frequency to the scan rate of received threat radar signals, for gating each said angle position program matrix input; and, means for detecting and indicating system receiver lock up information:

automatic reprogramming means comprising;

switching means for interchanging selected gating means of said angle position program matrix, said switching means being actuated by command signals responsive to system receiver lock up information.

* * * * *